Sept. 11, 1951  B. B. SCOTT  2,567,735
ROLLER CAM FOLLOWER
Filed Jan. 29, 1949
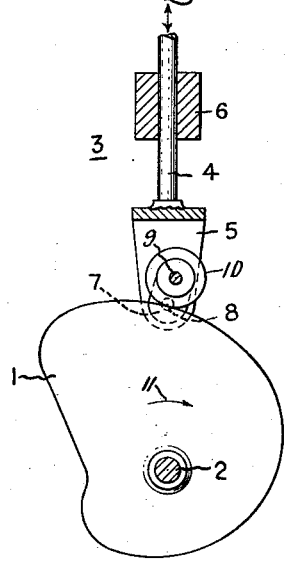
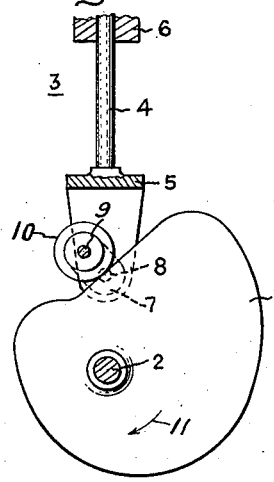
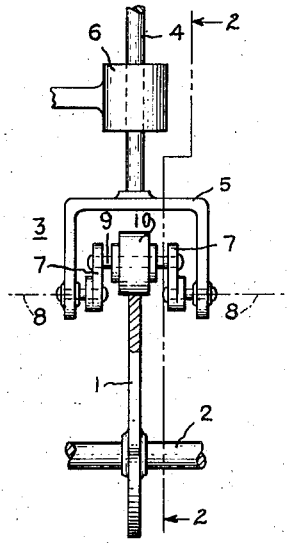
Inventor:
Benjamin B. Scott,
by *Clarke H. Mott*
His Attorney.

Patented Sept. 11, 1951

2,567,735

UNITED STATES PATENT OFFICE 2,567,735

ROLLER CAM FOLLOWER

Benjamin B. Scott, Schenectady, N. Y., assignor to General Electric Company, a corporation of New York Application January 29, 1949, Serial No. 73,636

4 Claims. (Cl. 74—569)

My invention relates to cams and has for its object the provision of a roller cam follower that can be used directly with a conventional cam without compensating the cam for the radius of the roller follower.

A chisel cam follower, as its name indicates, is shaped like a chisel with its edge normal to its line of motion. When actuated by a cam, the contact between cam and follower is along this edge line.

When a roller follower is used to avoid the cam wear caused by the use of a chisel point follower, the curve of the cam must be compensated since the line of contact with the cam varies over the surface of the roller as the cam revolves. A compensated curve is designed by plotting a cam to contact the instantaneous positions of a chisel point follower having the desired motion. Using this curve as the locus of the center of the roller, the envelope of the successive positions of the roller circumference becomes the compensated cam curve.

By the use of my invention, a roller follower becomes the equivalent of a chisel follower and may be used with a conventional cam without modification.

To allow the use of an ordinary cam without compensation, my invention employs a cam follower supplied with a forked end. Two lever arms are pivoted on the tines of said forked end along an axis perpendicular to the line of motion of the follower, and rigidly support a shaft upon which is mounted a rotatable roller, which is in contact with the cam. As the cam moves, the crank arms assume the direction of the force exerted by the cam. The radius of the roller is made equal to the distance between the center of the shaft and the pivot line. The pivot axis corresponds to the edge of a chisel cam follower by being the contact line between roller and cam for all cam positions so that with this follower an ordinary cam surface can be used without compensation.

For a more complete understanding of my invention, reference is made to the accompanying drawing of one application of my invention in which Fig. 1 is a view of the cam engaging the cam follower, Fig. 2 is a sectional view along the line 2—2 of Fig. 1 looking in the direction of the arrows; Fig. 3 is a section similar to Fig. 2 showing the cam in a different position of rotation.

Referring to the drawing, a cam 1 rotates on the shaft 2 to impart linear motion to the roller follower 3 of which the guide rod 4 transmits the motion imparted to the output (not shown). The rod 4 is attached to the fork 5 and is restricted to linear motion by passing through the guide member 6. Two crank arms 7 are pivoted respectively to the tines of the fork 5 so as to be movable about a pivot axis 8—8 perpendicular to the line of motion of the follower. The crank arms are rigidly attached to the shaft 9, which is parallel to the axis 8—8 and rotates about the axis 8—8. The cam roller 10 is rotatably mounted on the shaft 9 and engages the cam 1. The distance between the line 8—8 and the center line of the shaft 9 equals the radius of the roller 10, so that for any position of the crank arms, the line 8—8 is the single line of contact between the cam and the roller making it possible to use a conventional cam without compensation.

Due to rotation of the shaft 2 in the direction of arrow 11, the cam 1 and follower 3 proceed from the positions shown in Fig. 2 to that shown in Fig. 3. As shown in the drawing, the crank arms 7 follow the changing direction of the force exerted by the cam on the follower and the roller 10 is continuously tangent to the cam surface along the line 8—8. It should be noted that the line 8—8 corresponds to the edge of an equivalent chisel cam follower and compensation of the cam curve is unnecessary. Although the roller cam follower is shown applied to a rotating cam, it is understood that my invention is not restricted to that application.

While I have shown a particular embodiment of my invention, it will be understood, of course, that I do not wish to be limited thereto, since many modifications can be made, and I therefore contemplate by the appended claims to cover any such modifications as fall within the true spirit and scope of my invention.

What I claim as new and desire to secure by Letters Patent of the United States is:

1. A cam follower comprising a movable member ending in a fork, crank arms pivoted on the tines of said fork on a pivot axis normal to the direction of motion of said member, a shaft rigidly mounted on said crank arms and a roller rotatably mounted upon said shaft, the radius of said roller being equal to the distance between the center line of said shaft and said pivot axis.

2. A cam follower comprising a movable member, a fork attached to said member, crank arms pivoted on the tines of said fork about an axis normal to the motion of said member, a shaft mounted on said crank arms and a roller rotatably mounted upon said shaft, the radius of said roller being equal to the distance between the center of said roller and said axis.

3. A cam mechanism comprising a cam follower, a cam providing motion to said cam follower, a guide member restraining said follower to linear motion, said follower including a movable member slidably mounted in said guide, a fork attached to said movable member, crank arms pivoted upon the tines of said fork about a pivot axis normal to the line of motion of said movable member, a shaft mounted on said crank arms, a roller in contact with said cam rotatably mounted upon said shaft so that said arms assume the direction of application of force by said cam, the radius of said roller being equal to the distance between the center of said roller and said pivot axis so that for all positions of said cam, said pivot axis is the single line of contact between said cam and said follower.

4. A cam follower comprising a movable member to transmit motion to a load, a crank arm pivotally mounted on said movable member to rotate about an axis perpendicular to the line of motion of said movable member, a roller mounted on said crank arm for rotation about a second axis spaced from said first axis a distance substantially equal to the radius of said roller.

BENJAMIN B. SCOTT.

REFERENCES CITED

The following references are of record in the file of this patent:

UNITED STATES PATENTS

| Number | Name | Date |
| --- | --- | --- |
| 1,272,018 | Dietze | July 9, 1918 |

FOREIGN PATENTS

| Number | Country | Date |
| --- | --- | --- |
| 366,329 | Great Britain | Feb. 4, 1932 |
| 784,689 | France | July 22, 1935 |